M. SAND.
DRIVE GEARING FOR TRACTORS.
APPLICATION FILED AUG. 3, 1915.
1,224,109.
Patented Apr. 24, 1917.
4 SHEETS—SHEET 1.
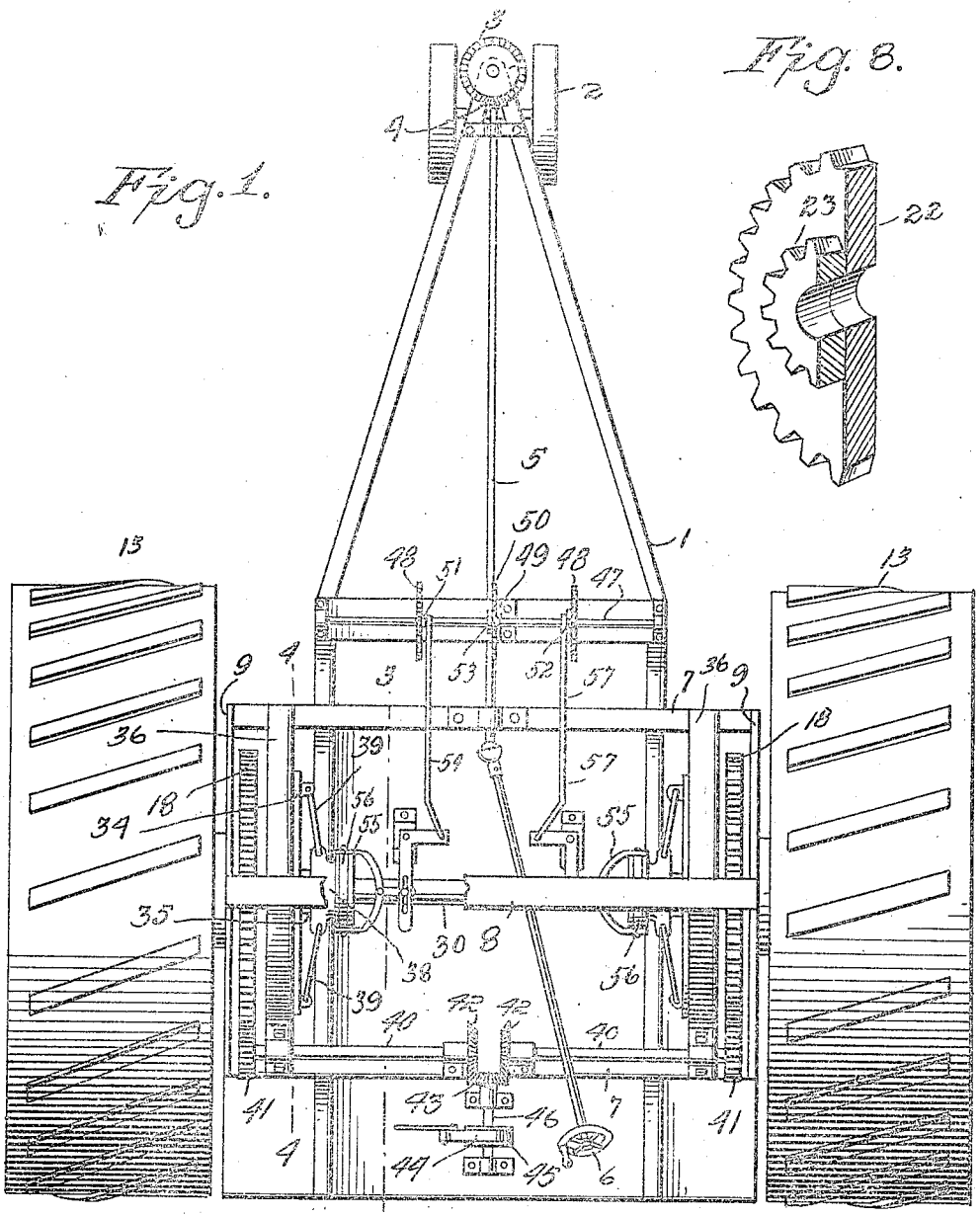
Witnesses
Inventor
M. Sand
By 
Attorneys M. SAND.
DRIVE GEARING FOR TRACTORS.
APPLICATION FILED AUG. 3, 1915.
1,224,109.
Patented Apr. 24, 1917
4 SHEETS—SHEET 2.
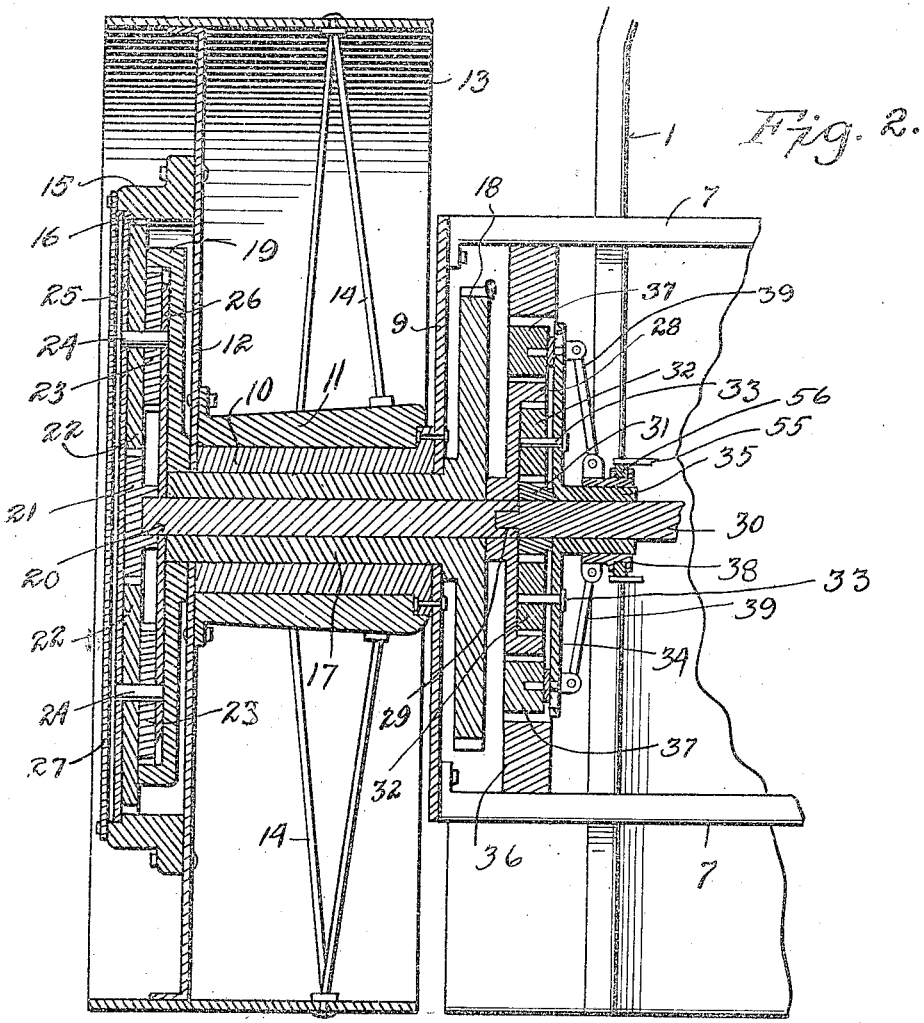
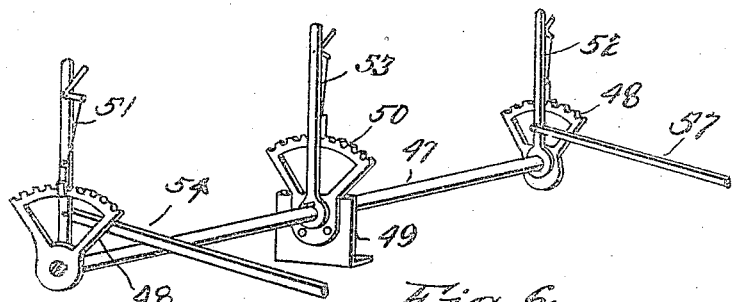

M. SAND.
DRIVE GEARING FOR TRACTORS.
APPLICATION FILED AUG. 3, 1915.
1,224,109.
Patented Apr. 24, 1917.
4 SHEETS—SHEET 3.
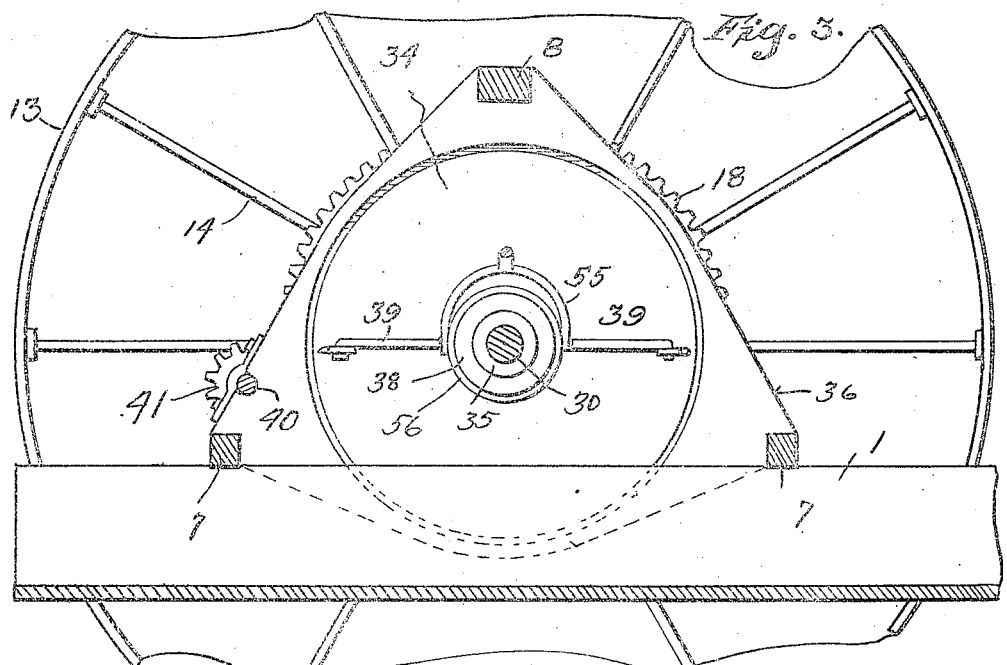
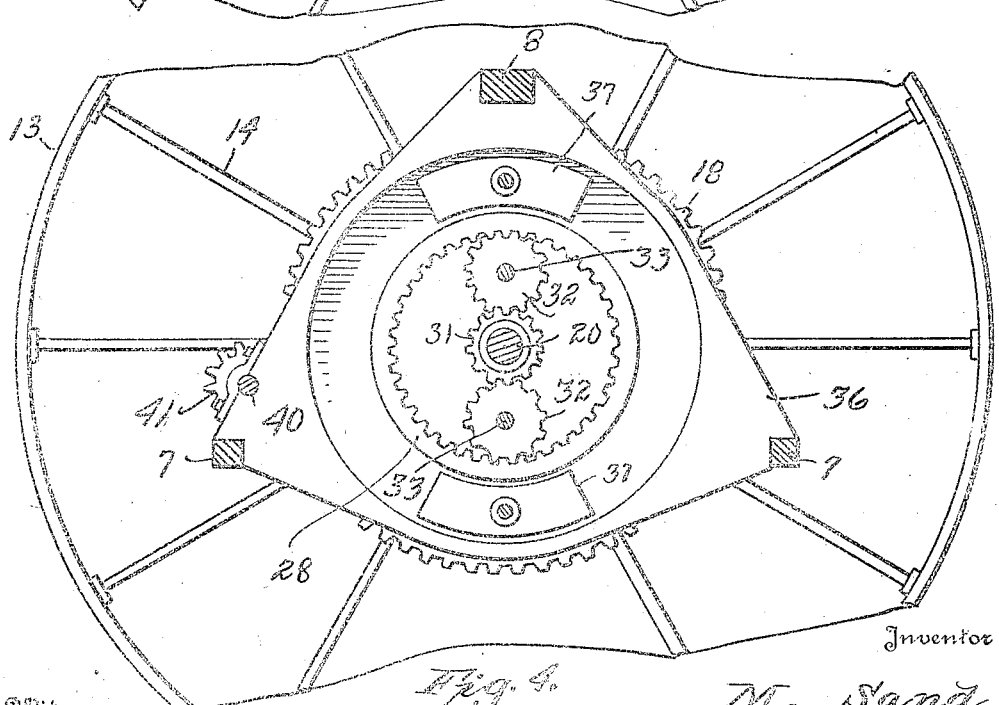
Inventor
M. Sand

M. SAND.
DRIVE GEARING FOR TRACTORS.
APPLICATION FILED AUG. 3, 1915.

1,224,109.

Patented Apr. 24, 1917.
4 SHEETS—SHEET 4.

Inventor
M. Sand

Witnesses

By

Attorneys

UNITED STATES PATENT OFFICE.

MARTIN SAND, OF GRYGLA, MINNESOTA.

DRIVE-GEARING FOR TRACTORS.

1,224,109.  Specification of Letters Patent.  Patented Apr. 24, 1917.

Application filed August 3, 1915. Serial No. 43,430.

*To all whom it may concern:*

Be it known that I, MARTIN SAND, a citizen of the United States, residing at Grygla, in the county of Marshall, State of Minnesota, have invented certain new and useful Improvements in Drive-Gearing for Tractors; and I do hereby declare the following to be a full, clear, and exact description of the invention, such as will enable others skilled in the art to which it appertains to make and use the same.

This invention relates to a drive gearing which is especially adapted for use on tractors.

An object of the invention resides in the provision of a device by means of which a tractor may be driven ahead, to the rear or turned.

A further object of the invention resides in so constructing the gearing that the drive wheels may be controlled to accomplish a very short turn.

With these and other objects in view, such as will appear as my description progresses, my invention resides in the combination and arrangement of parts as set forth in and falling within the scope of the appended claims.

In the drawings:—

Figure 1 is a plan view of a tractor showing my device mounted thereon, the tractor merely being represented conventionally;

Fig. 2 is a horizontal sectional view through the gearing for one of the wheels;

Fig. 3 is a vertical section on line 3—3 of Fig. 1;

Fig. 4 is a similar section on line 4—4 of Fig. 1;

Fig. 5 is a side elevation with the cover plate for the gearing removed;

Fig. 8 is a fragmental detail of one of the double pinions.

Referring to the drawings by reference characters wherein like parts are indicated by like characters throughout the several views:

Figure 6:
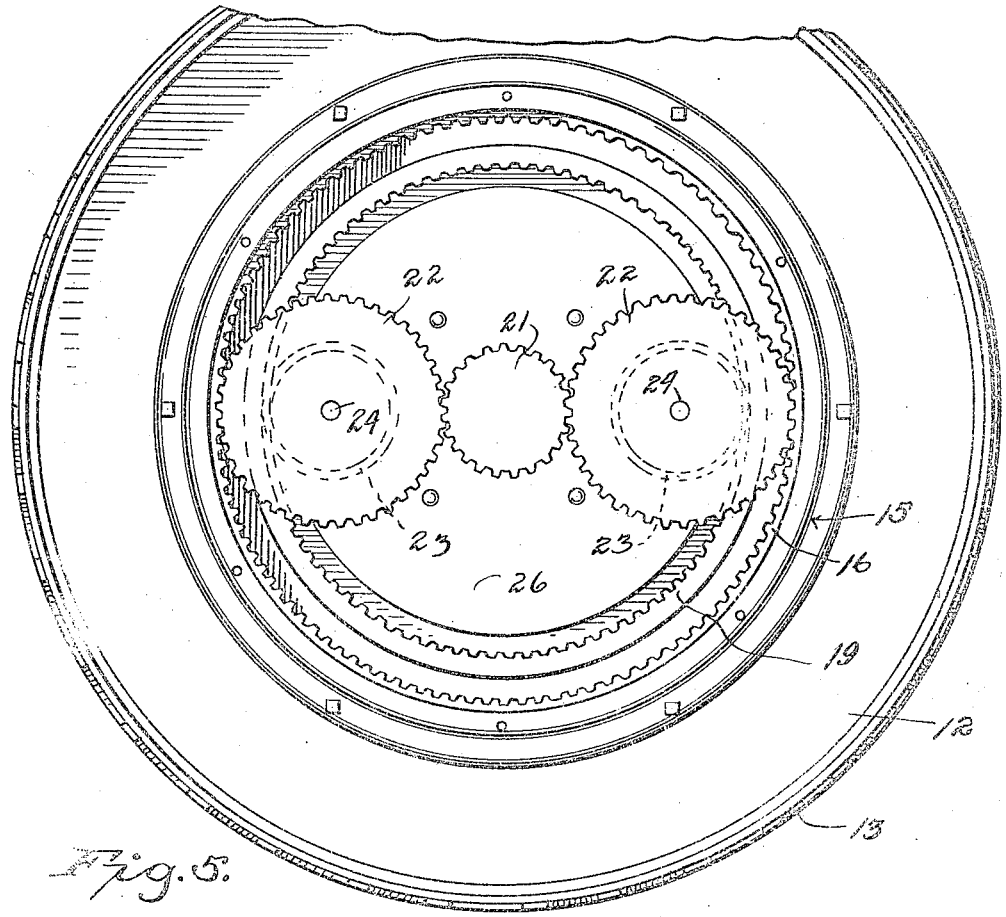
Fig. 6 is a fragmental perspective of the controlling levers.
Figure 7:
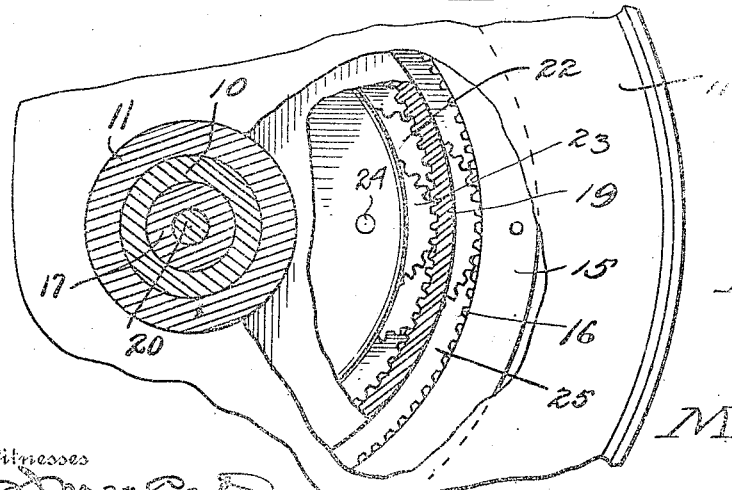
Fig. 7 is a section on line 7—7 of Fig. 2 with parts broken away.

In the drawing, I have illustrated a tractor, conventionally, which consists of a main frame 1 which is supported at the forward end by a truck 2. This truck is provided with a gear 3 with which a pinion 4 intermeshes, which pinion is carried by a rod 5 having a suitable steering handle 6 on the end thereof.

Mounted on the rear end of the frame 1 is a triangular frame which consists of a pair of lower bars 7, an upper bar 8 and end plates 9. Secured to the plates 9 and extending outwardly therefrom are skeins 10 on which hubs 11 are rotatably mounted. These hubs 11 are provided with plates 12 which are of circular formation and are located in wheels 13, serving as supports for said wheels in lieu of certain of the spokes. The wheels 13 are additionally supported by spokes 14 which are secured to the hubs 11 in the manner clearly shown in the drawing. Mounted on each of the plates 12 is a casting 15 which is provided with an internal gear 16. Extending through each of the skeins 10 is a sleeve 17 on one end of which is formed a gear 18 and on the other end of which an internal gear 19 is secured which is located within the casting 15 and which is of less diameter than the gear 16 on the said casting. A shaft 20 extends through and is rotatably mounted in each sleeve 17 and has a pinion 21 secured to one end thereof. Meshing with this pinion 21 is a pair of relatively larger pinions 22 which have pinions 23 formed thereon, the latter being smaller than the pinions 21. These pinions 22 and 23 are mounted on stub shafts 24 carried by plates 25 and 26 and the pinions 22 mesh with the internal gear 16 while the pinions 23 mesh with the internal gear 19. A cover plate 27 is secured to each casting 15 so as to prevent the access of dust or any other foreign matter to the gearing carried within the said casting. On the inner end of each of the shafts 20 is secured an internal gear 28. Suitably mounted in a socket 29 in each of the shafts 20 is an engine shaft 30 which is connected to an engine (not shown) in any suitable manner. A pinion 31 is secured to the shaft 30 adjacent each of the gears 28 and meshes with a plurality of pinions 32 which in turn mesh with the internal gear 28 and are mounted on stub shafts 33 carried by a plate 34. This plate 34 is provided with a collar 35 which is slidably mounted on the drive shaft 30. Mounted on the triangular frame and at each end thereof is a stationary ring 36 and mounted on the adjacent plates 34 are blocks 37 which are adapted to engage either the inner face of the rings or the outer face of the gears 28 for a purpose which will later appear.

These plates 34 are controlled by means of slidable collars 38 which are connected to the plates by arms 39 and are shifted in a manner which will later be described.

Extending transversely of the triangular frame are alined shafts 40 which have pinions 41 on the ends thereof intermeshing with the gears 18. Beveled gears 42 are secured to the inner ends of these shafts 40 and intermesh with the beveled gear 43, the rotation of which is controlled by a band brake 44 operable on a drum 45 which drum is mounted on a shaft 46.

Mounted on the frame 1 of the tractor is a transversely extending shaft 47 which has quadrant racks 48 secured to each end thereof. Secured to the frame 1 is a bearing box 49 through which the shaft 47 extends and in which it is rotatable. A quadrant rack 50 is secured to this box and is located between the racks 48. Controlling levers 51 and 52 are secured to the shaft 47 and are operable on the racks 48 while a controlling lever 53 is secured to the shaft and is operable on the rack 50. Extending from the lever 51 is a rod 54 which is provided with shipper arms 55 engaged with a band 56 mounted in a suitable groove in one of the collars 38 and the lever 52 is provided with a similar rod 57 which is similarly connected to the other of the collars.

In operation when the tractor is being driven forward the clutch blocks 37 will be engaged with the outer faces of the gears 28 and the plates 34 will be prevented from rotating. This will make the plates, the clutch blocks, the gears 28, the pinions 32 and the drive shaft 30 operate as one solid body and the direction of rotation of the same will be in the reverse direction to that of the drive wheels 13. The motion of the gears 28 will revolve the shafts 20 and consequently the pinions 21 on the ends thereof. The revolving of these pinions 21 will set the pinions 22 and 23 in motion, those on opposite sides of the pinion 21 being revolved in opposite directions. The revolution of the pinions 22 and 23 will be in the same direction as the rotation of the pinions 21. The gears 18 are held stationary by the pinions 41 which are in turn held stationary by the brake 44. Thus the pinions 23 will rotate within the gears 19 as stationary members and will cause the pinions 22 to impart forward motion to the gear 16 and thus to the drive wheel.

Now when it is desired to impart backward movement to the drive wheels, the clutch blocks 37 are moved into engagement with the adjacent faces of the rings 36. The engagement of these clutch blocks and the rings will hold the plates 34 stationary and thus allow the pinions 32 to revolve under the action of the pinions 31 on the drive shaft 30. The movement of these pinions will impart motion to the gears 28 in the opposite direction to that of the drive shaft and the power will be transmitted through the shafts 20 to the wheels to impart rearward motion to the same.

The clutch blocks may be shifted by the lever 53 either into engagement with the rings 36 or the gears 28 and when they are shifted by this lever the tractor will be moved either straight ahead or straight to the rear. The lever 51 may be shifted however independently of the lever 52 and thus one of the wheels be caused to revolve in a forward direction while the other revolves in a rearward direction or one of these levers may be so shifted that the clutch blocks will be in neutral positions and one of the wheels will stand still while the other revolves.

It will thus be seen that I have provided a drive gearing which will be particularly adapted for use on tractors so that the tractor may be driven either straight ahead or to the rear or turned in a very short space.

While I have illustrated and described a particular embodiment of my invention, it has merely been for the sake of convenience and I do not wish to be limited to that particular embodiment as it is obvious that numerous changes may be made within the scope of the appended claims.

What I claim is:—

1. In a drive gearing for wheeled vehicles; a frame, drive wheels mounted thereon and carrying internal gears, internal gears concentric with the first-mentioned gears and supported for rotary movement, double pinions meshing with the gears on each wheel, a drive shaft, a pinion on said shaft meshing with one of the pinions of each double pinion, and means for preventing movement of the last-mentioned internal gears.

2. In a drive gearing for tractors, the combination with a frame, of drive wheels mounted thereon, castings secured to the drive wheels and having internal gears, sleeves extending through the said wheels, internal gears secured to said sleeves and located within the castings, shafts extending through the sleeves and having pinions on their ends, double pinions mounted within the castings and meshing with the gears thereon, with the pinions on the aforementioned shafts and with the internal gears on the sleeves, means for maintaining the last mentioned internal gears stationary and means for imparting movement to the said shafts.

3. In a drive gearing for tractors, the combination with a frame having wheels mounted thereon, of means for driving said wheels including shafts, internal gears secured to the inner ends of said shafts, a drive shaft, pinions secured to said drive shaft, plates slidably mounted on the drive shaft, pinions mounted on the said plates and meshing with the internal gears and the pinions on the drive shaft, rings encircling the internal gears and secured to the frame and clutch blocks mounted on the plates and adapted to engage either the rings or the internal gears.

In testimony whereof, I affix my signature, in the presence of two witnesses.

MARTIN SAND.

Witnesses:
A. O. FLAHERLAND,
S. W. WYGAARD.